US007079601B2

(12) United States Patent
He

(10) Patent No.: US 7,079,601 B2
(45) Date of Patent: Jul. 18, 2006

(54) EFFICIENT CHANNEL ESTIMATION IN A DIGITAL COMMUNICATIONS SYSTEM

(75) Inventor: Shousheng He, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 656 days.

(21) Appl. No.: 09/885,375

(22) Filed: Jun. 19, 2001

(65) Prior Publication Data

US 2003/0021359 A1 Jan. 30, 2003

(51) Int. Cl.
*H03D 1/00* (2006.01)
(52) U.S. Cl. ...................................... 375/340; 375/149
(58) Field of Classification Search ........ 374/229–233, 374/331, 114, 321, 340; 370/105.1, 4, 292, 370/321, 335, 337, 331; 455/67.6, 67.11, 455/67.13, 296, 226.1; 375/340, 354, 231, 375/316, 350, 341, 262, 147, 136, 346, 343, 375/224, 226, 331, 233, 229, 232, 347
See application file for complete search history.

(56) References Cited

U.S. PATENT DOCUMENTS

| 5,251,233 | A |   | 10/1993 | Labedz et al. ............... 375/12 |
|---|---|---|---|---|
| 5,373,507 | A | * | 12/1994 | Skold ............................ 370/350 |
| 5,432,816 | A |   | 7/1995  | Gozzo .......................... 375/232 |
| 5,479,444 | A |   | 12/1995 | Malkamaki et al. ......... 375/231 |
| 6,002,716 | A |   | 12/1999 | Meyer et al. ................ 375/231 |
| 6,031,866 | A |   | 2/2000  | Oler et al. ................... 375/219 |
| 6,044,111 | A |   | 3/2000  | Meyer et al. ................ 375/231 |
| 6,084,862 | A | * | 7/2000  | Bjork et al. ................. 370/292 |
| 6,373,888 | B1| * | 4/2002  | Lindoff ........................ 375/231 |
| 6,418,175 | B1| * | 7/2002  | Pukkila et al. .............. 375/347 |
| 6,459,728 | B1| * | 10/2002 | Bar-David et al. .......... 375/231 |
| 6,631,160 | B1| * | 10/2003 | Piirainen et al. ............ 375/231 |
| 6,748,031 | B1| * | 6/2004  | Piirainen ..................... 375/340 |
| 6,775,521 | B1| * | 8/2004  | Chen ......................... 455/67.11 |
| 6,792,052 | B1| * | 9/2004  | Johansson ................... 375/340 |
| 6,859,491 | B1| * | 2/2005  | Zhou ........................... 375/231 |
| 6,907,092 | B1| * | 6/2005  | Yakhnich et al. ........... 375/346 |

FOREIGN PATENT DOCUMENTS

EP          0 954 142 A1     3/1999

OTHER PUBLICATIONS

Channel estimation using aperiodic binary sequences Tellambura, C. et al; Communications Letters, IEEE vol. 2, Issue 5, May 1998 pp.: 140-142.*

(Continued)

*Primary Examiner*—Jay K. Patel
*Assistant Examiner*—Jacob Meek

(57) ABSTRACT

A channel estimation method and apparatus for GSM/EDGE digital communications systems utilizing previously unexploited properties of GSM/EDGE training sequences to permit a more efficient initial channel estimation for equalizer operation and for joint synchronization and equalizer window sizing. In particular, any consecutive 16-symbol segment of the 26-symbol GSM/EDGE training sequences is both shift invariant and order invariant; and these properties enable channel estimation to be carried out on delayed (shifted) training sequence segments, permitting ISI corrupted leading symbols to be avoided in computations and leading taps to be estimated, using the same training sequence segments, regardless of equalizer window size; and to enable all the 1–8 tap channels to be estimated without matrix inversion, permitting a significant reduction in computational complexity. A two-dimensional recursive relation is established that leads to efficient channel tap calculation for different sync points and tap-positions which enables practical joint optimization of synchronization and window sizing for the equalizer.

6 Claims, 3 Drawing Sheets

OTHER PUBLICATIONS

A channel estimation using sliding window approach and tuning algorithm for MLSE Hyoung-Kyu Song; Communications Letters, IEEE vol. 3, Issue 7, Jul. 1999 pp.: 211-213.*

On the minimization of overhead in channel impulse response measurement Youngyearl Han; Vehicular Technology, IEEE Transactions on vol. 47, Issue 2, May 1998 pp.: 631-636.*

Blind detection of equalization errors in communication systems Dogancay, K.; Kennedy, R.A.; Information Theory, IEEE Transactions on vol. 43, Issue 2, Mar. 1997 pp.: 469-482.*

38th IEEE Vehicular Technology Conference, *"Bit Synchronization and Timing Sensitivity in Adaptive Viterbi Equalizers for Narrowband-TDMA Digital Mobile Radio Systems"*, Jun. 1988, A. Baier et al. pp. 377-384.

IEEE VTS 52nd Vehicular Technology Conference, Sep. 2000, *Iterative Channel Estimation for EGPRS*, P. Strauch et al. pp. 2271-2277.

Standard Search Report issued by European Patent Office on Apr. 9, 2002.

* cited by examiner

EFFICIENT CHANNEL ESTIMATION IN A DIGITAL COMMUNICATIONS SYSTEM

BACKGROUND OF THE INVENTION

1. Field of the Invention

The present invention relates generally to the field of digital communications; and, more particularly, to an efficient channel estimation method and apparatus for a GSM/EDGE digital communications system which utilizes special properties of GSM/EDGE training sequences and leads also to a practical joint optimization of synchronization and equalizer window sizing.

2. Description of the Prior Art

Inter-symbol interference (ISI) is an important problem in digital communications systems, including those systems which operate in accordance with the Global System for Mobile Communications (GSM) specifications. ISI is caused by time dispersion in the transmission channel over which a signal is transmitted, and adversely affects the quality of the received signal. In effect, ISI causes distortion of the transmitted signal which, in turn, causes symbol errors in the received signal such that it becomes difficult for the receiver to determine what data was actually sent.

As is well-known in the art, the usual way to compensate for ISI in a GSM system is to provide a channel estimation-based equalizer in the receiver. Basically, a model or estimate of the propagation channel over which a received signal was transmitted is created; and the equalizer then uses that information to estimate the sending symbols that best fit the received signal.

EDGE (Enhanced Data rates for Global Evolution) is an interface mode which has recently been developed for GSM Networks. EDGE's principal features include new modulation and coding schemes which increase data capacity and speed in the air interface. EDGE is fully based on GSM and uses the same TDMA (Time Division Multiple Access) frame structure as GSM, such that it allows GSM operators to use existing GSM radio bands to offer wireless multimedia-based services and applications.

In GSM/EDGE systems, the performance of the equalizer in combating ISI depends heavily on the quality of the channel estimation; and the quality of the channel estimation is, in turn, highly sensitive to the accuracy of burst synchronization (the term "synchronization" in this document signifies "burst synchronization") and the size of the equalizer window.

To effectively combat ISI, the span of the equalizer window must be large enough to cover the maximum delay spread of the channel. However, an over-sized equalizer window will result in performance losses in channels with shorter delay spread due to inaccurate channel estimation, inadequate synchronization and increased noise contribution. In addition, synchronization can be optimized only with the knowledge of the equalizer window to capture maximum energy in the window span. In general, the interdependency of synchronization and equalizer window sizing makes efficient optimization difficult to achieve under different channel conditions. Joint optimization was deemed as too expensive in practical implementation.

Because of this interdependency, a careful compromise has to be made for a traditional equalizer with fixed window span so that the size of the window can provide adequate performance in long delay spread channels, such as Hilly Terrain (HT), without losing too much in short delay spread channels, such as Typical Urban (TU).

When the equalizer window size is set, there are two approaches for burst synchronization, a correlation-based approach and a least square error (LSE) approach. As will be described more fully hereinafter, in current GSM receivers, synchronization is done by a correlation-based approach in which the central 16 symbols of a known 26-symbol training sequence is correlated with the central 16 symbols of the training sequence in the received signal. The synchronization is determined by either the centers of gravity of the correlation or the maximum correlation energy in the equalizer window. In the LSE approach, for each possible synchronization point, an estimation of the channel is made, and synchronization is determined by comparing the expected and received training sequence with least square error criterion.

Neither of these approaches, however, is fully satisfactory. The correlation-based algorithm suffers from performance degradation due to inaccurate synchronization, especially in long dispersive channels, while a straightforward LSE-based algorithm suffers from a high degree of computational complexity (mainly due to multiple channel estimation).

SUMMARY OF THE INVENTION

The present invention provides an initial channel estimation method and apparatus in a GSM/EDGE digital communication systems which utilizes special properties of GSM/EDGE training sequences to achieve a more efficient channel estimation. A two-dimensional recursion is further established to enable practical joint LSE optimization of burst synchronization and adaptive equalizer window sizing.

More particularly, an embodiment of the present invention provides a method for efficient estimation of the transmission channel in a digital communications system which operates in accordance with GSM/EDGE specifications. The system has a receiver which receives a signal transmitted over the transmission channel and which includes a channel estimation-based equalizer that uses an estimate of the transmission channel to equalize the received signal. A received signal burst includes a 26-symbol training sequence. The method includes using any consecutive 16-symbol segment of the 26-symbol training sequence to estimate, without matrix operation, the transmission channel at different possible synchronization points for different equalizer window sizes.

The present invention provides a more efficient channel estimation method by recognizing and utilizing two previously unexploited properties of GSM/EDGE training sequences which arise from the cyclic prefix structure of the training sequences. In particular, the present invention recognizes that the 26-symbol GSM/EDGE training sequences are, within certain ranges, both shift invariant and order invariant. The property of being shift invariant enables a channel estimation to be carried out with delayed (shifted) training sequence segments; which, in turn, permits: I. The ISI corrupted leading training sequence symbols to be avoided as much as possible in long dispersive channels; and II. The leading taps of a channel to be estimated using the same training sequence segments, regardless of the size of the equalizer window. The property of being order invariant permits channels with different time dispersion, from 1–8 symbols (as complex polynomials of $1-8^{th}$ order) to be estimated without matrix inversion if any consecutive 16-symbol segment of the training sequence is used. This results in a significant reduction in computational complexity in channel estimation for varying window size which can be adaptive to the actual delay spread of the channel. Combining these two properties, a two-dimensional recursive relation can be established for different synchronization points and tap positions, which makes a practical LSE joint optimization of synchronization and equalizer window sizing possible.

In general, the present invention provides an efficient channel estimation for GSM/EDGE systems which, beside direct utilization, is fundamentally important to achieving a practical implementation of joint LSE synchronization and equalizer window sizing.

Yet further advantages and specific details of the present invention will become apparent hereinafter in conjunction with the following detailed description of presently preferred embodiments.

DETAILED DESCRIPTION OF PRESENTLY PREFERRED EMBODIMENTS

Figure 1:
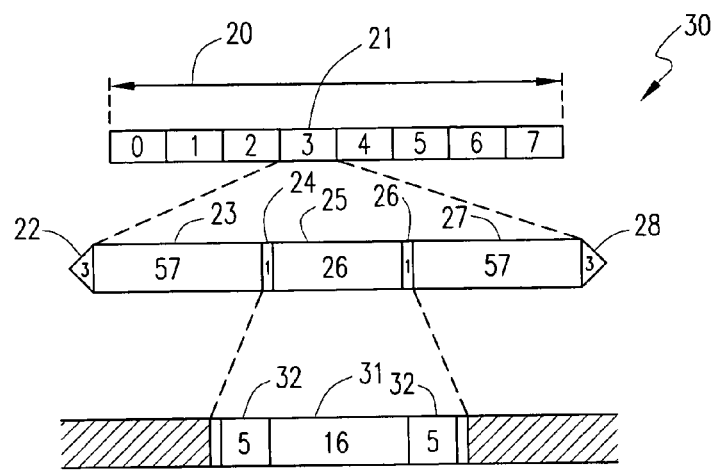
FIG. 1 schematically illustrates the structure of a TDMA frame used in a digital communications system according to the GSM/EDGE standard.

FIG. 1 schematically illustrates the structure of a TDMA frame 20 used in a mobile telecommunications system according to the GSM standard. Frame 20 has a duration of 4.615 ms and accommodates 8 information channels (time slots) 21, designated 0–7 in FIG. 1. Each of the 8 time slots has a duration of 0.577 ms and contains a 148-bit signal portion 30 and an 8.25-bit guard portion (not shown) which functions to maintain separation between signals in adjacent time slots. The 148-bit signal portion is generally referred to as a normal burst and comprises a first 3-bit tail bit section 22, a first 57-bit coded data section 23, a first 1-bit housekeeping bit section 24, a 26-bit training sequence section 25, a second 1-bit housekeeping bit section 26, a second 57-bit coded data section 27 and a second 3-bit tail bit section 28.

Figure 2:
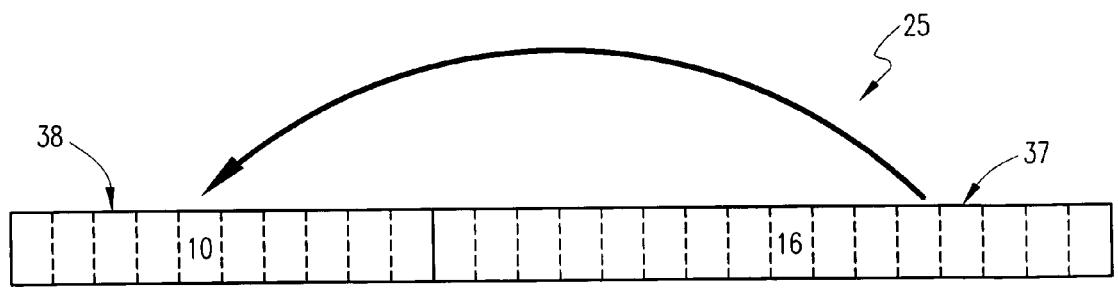
FIG. 2 schematically illustrates a cyclic prefix structure of GSM/EDGE training sequences.

The 26-bits comprising the training sequence section 25 in a GSM digital communications system, is typically viewed as being divided into a centrally located portion 31 of 16-bits (sometimes referred to as the midamble portion), and side portions 32 of 5-bits each. Alternatively, in a GSM/EDGE digital communications system, the 26-bit training sequence 25 can be also viewed as including a 16-bit white sequence 37 and a 10-bit cyclic prefix 38 as is illustrated in FIG. 2.

As mentioned previously, inter-symbol interference can occur in digital communications systems as a result of time dispersion in the transmission channel over which a signal is transmitted; and in GSM/EDGE systems, the usual way to compensate for ISI is to provide a channel estimation based equalizer in the receiver.

Figure 3:
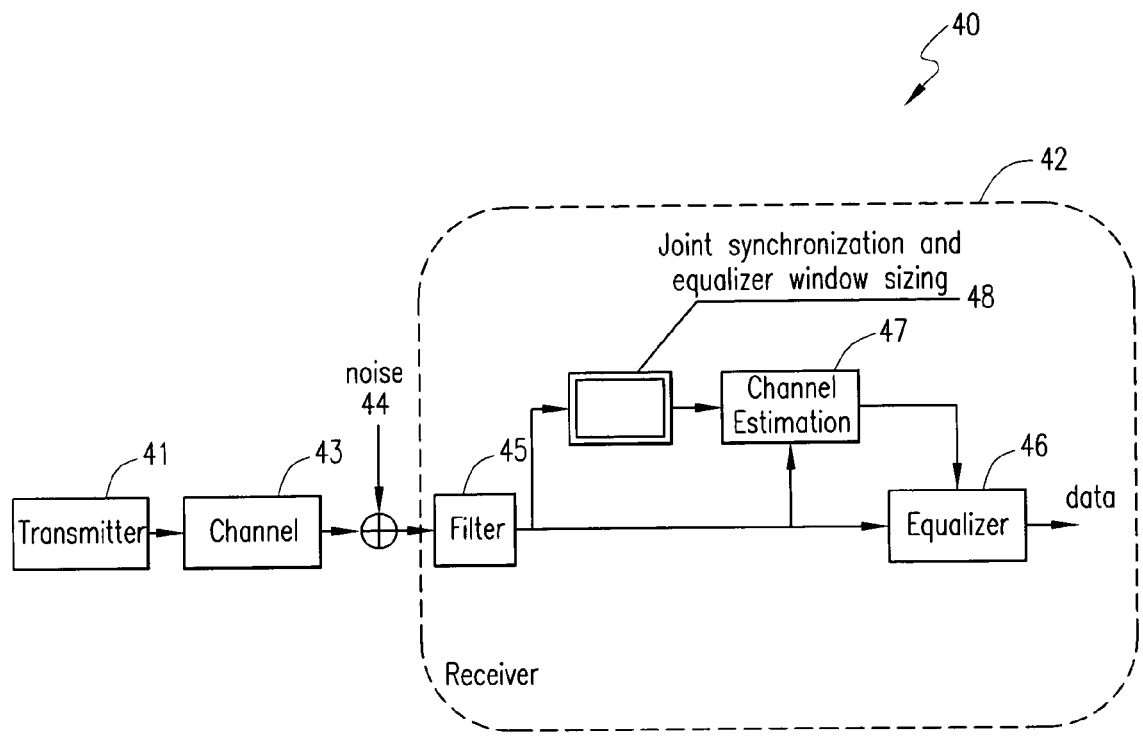
FIG. 3 is a block diagram of a simplified baseband model for a transmitter-receiver chain to illustrate data recovery signal processing in GSM/EDGE digital communications systems.

FIG. 3 is a block diagram of a simplified baseband model of a transmitter-receiver chain, generally designated by reference number 40, to illustrate data recovery signal processing in a GSM/EDGE digital communications system. In FIG. 3, the transmitter side is shown at 41 and the receiver side is illustrated at 42. A signal is transmitted from the transmitter side 41 to the receiver side 42 over a transmission channel 43. The transmission characteristics of the transmission channel frequently change due to a variety of factors, including the motion of the mobile terminals, the fluctuation of multi-path (time dispersive) propagation channels and variant interferences, which are generally designated in FIG. 3 by the noise component 44 introduced into the transmission channel. As is well-known to those skilled in the art, the multi-path channel and the noise component can adversely affect the quality of the received signal, e.g., cause intersymbol interference; and this necessitates that the received signal be corrected, typically by means of a channel estimation-based equalizer.

Specifically, as shown in FIG. 3, at the receiver side, the received signal, which includes the transmitted signal with intersymbol interference and the noise component, is, after being filtered by filter 45, sent to an equalizer 46 which attempts to correct the received signal utilizing an estimate of the transmission channel as shown at 47. The channel estimation, in turn, is a function of burst synchronization and equalizer window sizing as shown at 48. The performance of the equalizer can be improved significantly if, in an advanced receiver, the equalizer window size is adaptive to the actual delay spread of the channel. Data representing an estimate of the actual transmitted symbols, as determined by the equalizer, is then output for further processing by the receiver.

Figure 4:
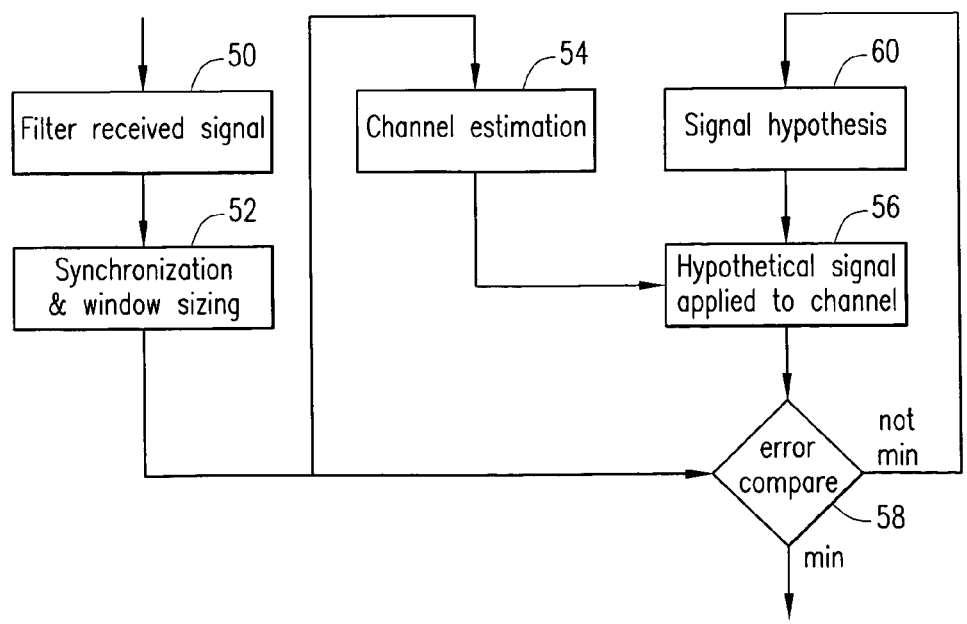
FIG. 4 is a flow chart illustrating channel equalizer processing in a GSM/EDGE digital communications system.

FIG. 4 is a flow chart which illustrates, in somewhat greater detail, the steps of the channel equalization processing which takes place in an advanced receiver 42 of FIG. 3. Specifically, after filtering the received signal at step 50, synchronization and equalizer window sizing according to the delay spread of the actual channel is performed as shown at step 52. An estimate of the transmission channel is then made at step 54, and a hypothetical signal provided in step 60 is applied to the estimated channel at step 56. An error comparison is made between the hypothetical signal applied to the estimated channel from step 56 and the synchronized received signal at step 58. If the result of the error comparison is not at a minimum value (not min output of step 58) a revised signal hypothesis is made in step 60, the new revised signal is applied to the hypothetical channel at step 56, and a new comparison is made at step 58. The comparison process is continued until the result of the comparison is at a minimum value (min output of step 58), at which time the process is completed. This processing is typically carried out with a specific algorithm for sequence estimation, for example, the well-known Viterbi algorithm.

As mentioned above, and as should be apparent from FIGS. 3, the performance of the equalizer 46 is dependent on the quality of the transmission channel estimation made at 47. This estimation, in turn, is highly dependent on the accuracy of the burst synchronization and equalizer window sizing at 48. The burst synchronization and equalizer window size are interdependent on one another, and this interdependency makes efficient optimization not trivial in different channel conditions. In contrast to the traditional equalizer with a fixed span, a varying window sizing adaptive to the actual delay spread of the channel is made possible by the efficient channel estimation proposed here so that a much improved performance can be reached in both long delay spread channels such as Hilly Terrain, and short delay spread channels such as Typical Urban.

Assuming an equalizer window size m, there are two approaches for burst synchronization; a correlation-based approach and a least square error (LSE) approach.

Synchronization in current GSM receivers is done using a correlation-based approach by correlating the central 16 bits of the known 26-bit training sequence with the central 16 bits of the training sequence of the received burst.

$$c(k) = \sum_{i=5}^{20} r(i+k)t(i), \quad k = 0, \ldots, w-1 \qquad (1)$$

where w is the size of the synchronization window, r(i) is the received samples and t(i) is the known training sequence. Synchronization can be determined by either center of gravities of or maximum energy in the equalizer span of c(k).

In the LSE approach, for each possible synchronization point, a least square estimation of the channel is made, $$H = \Phi^{-1} T^T R = (T^T T)^{-1} T^T R \qquad (2)$$

where R is the vector of received symbols, and $\Phi$ is an m×m auto-correlation matrix of the training sequence symbols, $$\Phi = T^T T \qquad (3)$$

T is a Toeplitz matrix of the training symbols $$T = \begin{bmatrix} t_{m-1} & t_{m-2} & \cdots & t_0 \\ t_m & t_{m-1} & \cdots & t_1 \\ \vdots & \vdots & \cdots & \vdots \\ t_{n-1} & t_{n-2} & \cdots & t_{n-m} \end{bmatrix} \qquad (4)$$

Synchronization is determined by least square error criteria $$p = \operatorname{argmin}\left(\alpha^m \sum_k |r(k) - \hat{r}_p(k)|^2\right) \qquad (5)$$

where $\alpha > 1$ is a penalty factor, $\hat{r}_p(k)$ is an estimate of the received symbols $$\hat{r}_p(k) = \sum_{i=0}^{m-1} h_p(m-1-i)t(k+i) \qquad (6)$$

Neither of the above approaches, however, is fully satisfactory. The correlation-based algorithm suffers from performance degradation due to inaccurate synchronization. Performance losses are especially significant in long dispersive channels. The LSE-based algorithm provides higher quality channel estimation when accurate synchronization is obtained with equation (5); however, it has not been widely implemented due to high computational complexity, since, in general, equation (6) requires knowledge of all the channel taps at every possible synchronization position with sufficient accuracy. The complexity is even higher if channel estimation has to be adapted for different equalizer window size m using equation (2).

In a traditional GSM receiver, only 5-tap channel estimation is usually made, regardless of the actual channel conditions. It is known that if the 16-symbol mid-amble of the training sequence is used for a 5-tap channel estimation, $$T(5,1) = \begin{bmatrix} t_5 & t_4 & \cdots & t_1 \\ t_6 & t_5 & \cdots & t_2 \\ \vdots & \vdots & \cdots & \vdots \\ t_{20} & t_{19} & \cdots & t_{16} \end{bmatrix} \qquad (7)$$

the auto-correlation matrix of the training sequences have a special form $$\Phi(5,1) = T^T(5,1)T(5,1) = 16 I_5 \qquad (8)$$

where $I_5$ is a (5×5) identity matrix. Here we have made the channel-taps (the order of channel vector polynomial), which determine the row dimension of T, and the index of the first training symbol in T explicit parameters of the function. Equation (8) has been used in 5-tap channel estimation, $$H = \Phi^{-1} T^T R = \frac{1}{16} T^T R \qquad (9)$$

In general, however, when Equation (2) is used for initial channel estimation for an equalizer window other than 5, matrix inversions is required.

We have now discovered that the GSM/EDGE training sequences have two additional properties, not previously exploited, which permit channel estimation to be carried out more efficiently. More particularly, rewriting equation (8) in the following more general form reveals that the autocorrelation matrix of any consecutive 16-symbol segment of the GSM/EDGE training sequence is, within certain range, both shift invariant and order invariant.

Property I. Shift Invariant:

$$\Phi(m,d) = T^T(m,d)T(m,d) = 16 I_m \quad 0 \le d \le (26-(16+m)+1) \qquad (10)$$

Property II. Order Invariant:

$$\Phi(m,d) = T^T(m,d)T(m,d) = 16 I_m \quad 1 \le m \le 7 \qquad (11)$$

Property I is due to the cyclic prefix nature of GSM/EDGE training sequences, in which the 26-bit training sequence is constructed by prepending the last 10 bits to its front as shown in FIG. 2. This property enables a channel estimation of the form of equation (9) be carried out on delayed (shifted) training sequence segments. This flexible delay brings two important benefits:

(1) ISI corrupted leading symbols can be avoided in the computation; and
(2) the leading taps of a channel can be estimated using the same training sequence segments, regardless of the size of the equalizer window.

Property II enables channel estimation to be done for different equalizer windows ranging from 1 to 7 taps. It can be stretched further. It has been found that when m=8, four of the eight specified training sequence code (TSC) satisfy equation (11), and the auto-correlation matrix for the other four training sequences is in a specific sparse form:

$$\Phi(8, d) = \begin{bmatrix} 16 & 0 & \cdots & \pm 4 \\ 0 & 16 & \cdots & \cdot \\ \cdot & \cdot & \cdot & \cdot \\ 0 & \cdot & \cdot & 16 & \cdot \\ \pm 4 & 0 & \cdots & 16 \end{bmatrix} \quad (12)$$

The inverse of equation (12) has the same sparse, symmetric structure:

$$\Phi^{-1}(8, d) = \frac{1}{16} \begin{bmatrix} \alpha & 0 & & & \beta \\ 0 & 1 & & & \\ & & \cdot & & \\ & & & 1 & \\ \beta & & & & \alpha \end{bmatrix} \quad (13)$$

where $\alpha=1.0667$, $\beta=\pm 0.2667$. This means that if equation (9) is used for an estimation of 8-tap channels, only minor justification is necessary for certain TSCs:

$$\begin{bmatrix} h_0 \\ h_7 \end{bmatrix} = \begin{bmatrix} \alpha & \beta \\ \beta & \alpha \end{bmatrix} \begin{bmatrix} h_0 \\ h_7 \end{bmatrix} \quad (14)$$

Property II indicates that not only a 5-tap channel, but all the 1–8 tap channels can be estimated efficiently using equation (9) without matrix inversion if any consecutive 16-symbol segment of the training sequence is used. Utilization of these properties has a fundamental impact on the computational complexity of the channel estimation for different equalizer window size.

When an LSE approach is used for joint synchronization and equalizer window sizing, for a hypothetical sync position p and an equalizer window size m, by utilizing the properties discussed above, channel estimation can be computed as in equation (9). With the exception of the constant factor, it can be further expressed in an explicit convolution form, $$h(p, k) = \sum_{i=0}^{15} t(m+i-k)r(m+i+p), \quad \begin{array}{l} 0 \leq p < w \\ 0 \leq k < m \end{array} \quad (15)$$

This can be considered as a FIR-style computation. For the next tap with k+1, a recurrent relation can be easily established, $$\begin{aligned} h(p, k+1) &= \sum_{i=0}^{15} t(m+i-(k+1))r(p+m+i) \quad (16) \\ &= \sum_{i=-1}^{14} t(m+i-k)r(p+1+m+i) \\ &= h(p+1, k) + t(m-1-k)r(p+m) - \\ &\quad t(m+15-k)r(p+m+16) \end{aligned}$$

Figure 5:
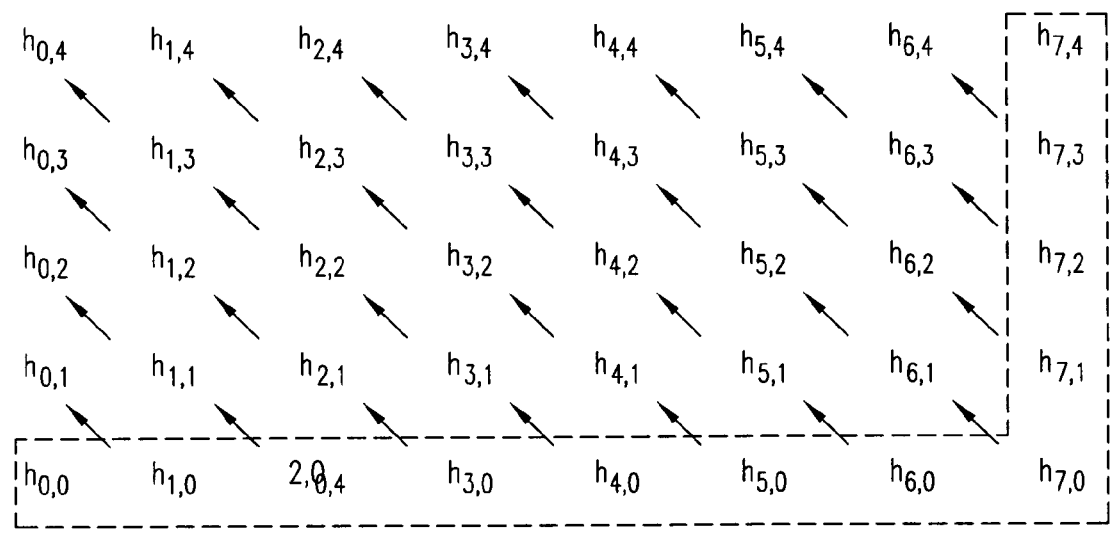
FIG. 5 illustrates a two-dimensional recursive relation in channel estimation for different synchronization points and channel tap positions according to a presently preferred embodiment of the invention.

Using this recursion in an IIR-style computation, a new tap can be calculated using only 4 real MAC operations (since the training sequences are real). This two-dimensional (sync-point tap-position) recursive relation can be depicted as shown in FIG. 5 for m=5, w=8. Computation of the last row and the last column is done by using equation (15), the rest can be recursively calculated using equation (16).

To avoid channel estimation error caused by ISI corrupted receiving training symbols, by property I, we can always choose a training sequence segment that is close to the end. In practice, we often choose the last but one m+15 symbols of the training sequence in the estimation (the final symbol in the training sequence is not used, to avoid possible precursor ISI corruption). When the next last m+15 symbols are chosen, equation (15) can be rewritten in a form independent of the equalizer window size m $$h(p, k) = \sum_{i=0}^{15} t(i-k+9)r(p+i+9), \quad \begin{array}{l} 0 \leq p < w \\ 0 \leq k < M_{\max} \end{array} \quad (17)$$

Equation (16) can be adjusted accordingly by simply replacing m with 9.

With the present invention, an efficient initial channel estimation method has been obtained for different equalizer window size spanning from 1–8 taps by utilizing the unique properties of GSM/EDGE training sequences described above. An efficient channel estimation at different sync points for different window size is essential to a practical implementation of joint optimization of synchronization and equalizer window sizing. The computational complexity of initial channel estimation by the approach according to the present invention is less than 10% of that of a brute force LSE approach.

The presented method has been put into simulation and verified. Simulation shows that a significant performance gain is observed in long time dispersive channels with joint optimization compared to the correlation based synchronization.

It should be emphasized that the term comprises/comprising when used in this specification is taken to specify the presence of stated features, integers, steps or components but does not preclude the presence or addition of one or more other features, integers, steps, components or groups thereof.

It should also be emphasized that while what has been described herein constitutes presently preferred embodiments of the invention, it should be recognized that the invention could take numerous other forms. Accordingly, it should be understood that the invention should be limited only insofar as is required by the scope of the following claims.

The invention claimed is:

1. A method of estimating a transmission channel in a digital communications system which operates in accordance with GSM specifications, said communications system including a receiver which receives a signal transmitted over the transmission channel, said receiver including a channel estimation-based equalizer, said equalizer having a window size adapted to the actual delay spread of the transmission channel, and said equalizer using an estimate of the transmission channel for synchronizing and correcting said received signal, said received signal including a 26-symbol training sequence, said method comprising:
   estimating without matrix inversion, the transmission channel for different channel spans m, where $1 \leq m \leq 8$, using at different synchronization points, the last m+15 consecutive symbols of the 26-symbol training sequence except for a group of symbols comprising the last four or fewer symbols:

wherein tap values for different synchronization points and tap positions are obtained in a two-dimensional recursive computation step for joint optimization of synchronization and window sizing of the egualizer using Least Sguare Error (LSE) criterion; and wherein the tap values for different synch points are calculated in a 2-dimensional "north-west" direction.

2. The method according to claim 1, wherein the digital communications system operates in accordance with GSM/EDGE specifications.

3. The method according to claim 1, wherein the estimating step includes using delayed (shifted) segments in the training sequence for the estimation.

4. The method according to claim 1,wherein the using step includes using a Least Square Error (LSE) approach for the estimation.

5. A method for estimating a transmission channel in a digital communications system which operates in accordance with GSM specifications, said communications system including a receiver having a channel estimation-based equalizer, said method comprising:

receiving in the receiver, a signal transmitted over the transmission channel, said received signal including a 26-symbol training sequence;

adapting a window size of the equalizer to an actual delay spread of the transmission channel;

using in the equalizer an estimate of the transmission channel for synchronizing and correcting the received signal; and estimating without matrix inversion, the transmission channel for different channel spans m, where $1 \leq m \leq 8$, using at different synchronization points, the last m+15 consecutive symbols of the 26-symbol training sequence except for a group of symbols comprising the last four or fewer symbols.

6. A method of estimating a transmission channel in a digital communications system that operates in accordance with GSM specifications, said communications system including a receiver that receives a signal transmitted over the transmission channel, said receiver including a channel estimation-based equalizer, said equalizer having a window size adapted to the actual delay spread of the transmission channel, and said equalizer using an estimate of the transmission channel for synchronizing and correcting the received signal, the received signal including a 26-symbol training sequence, said method comprising:

estimating without matrix inversion, the transmission channel for different channel spans m, where $1 \leq m \leq 8$, using at different synchronization points, the last m+15 consecutive symbols of the 26-symbol training sequence except for a group of symbols comprising the last four or fewer symbols;

wherein tap values for different synchronization points and tap positions are obtained in a two-dimensional recursive computation step for joint optimization of synchronization and window sizing of the equalizer using Least Square Error (LSE) criterion; and wherein the estimating step includes using an LSE approach for joint synchronization and equalizer window sizing.

* * * * *

UNITED STATES PATENT AND TRADEMARK OFFICE
CERTIFICATE OF CORRECTION

| | | |
|---|---|---|
| PATENT NO. | : 7,079,601 B2 | Page 1 of 1 |
| APPLICATION NO. | : 09/885375 | |
| DATED | : July 18, 2006 | |
| INVENTOR(S) | : He | |

It is certified that error appears in the above-identified patent and that said Letters Patent is hereby corrected as shown below:

On The Title Page, Item (56), under "U.S. PATENT DOCUMENTS", Line 12, delete "B1" and insert -- B2 --, therefor.

In the Drawings, on Sheet 3 of 3, in FIG. 5, Line 5, delete "$2.0_{0.4}$" and insert -- $h_{2.0}$ --, therefor.

In Column 9, Lines 1–2, in Claim 1, delete "seguence" and insert -- sequence --, therefor.

In Column 9, Line 3, in Claim 1, delete ":" and insert -- ; --, therefor.

In Column 9, Line 7, in Claim 1, delete "egualizer" and insert -- equalizer --, therefor.

In Column 9, Line 8, in Claim 1, delete "Sguare" and insert -- Square --, therefor.

Signed and Sealed this

Eleventh Day of December, 2007

JON W. DUDAS
*Director of the United States Patent and Trademark Office*